March 18, 1958  L. F. ROEHMANN  2,827,508
TERMINAL ASSEMBLY FOR SHIELDED CABLES
Filed Feb. 24, 1953
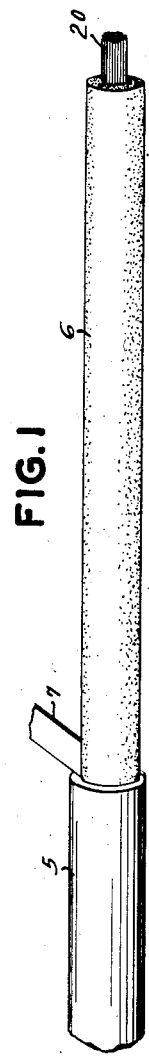
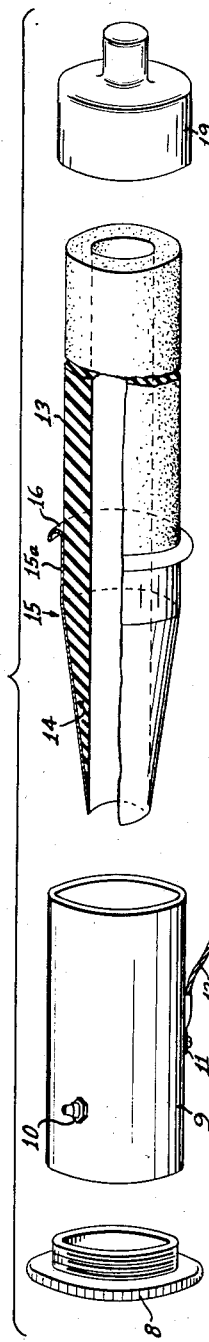
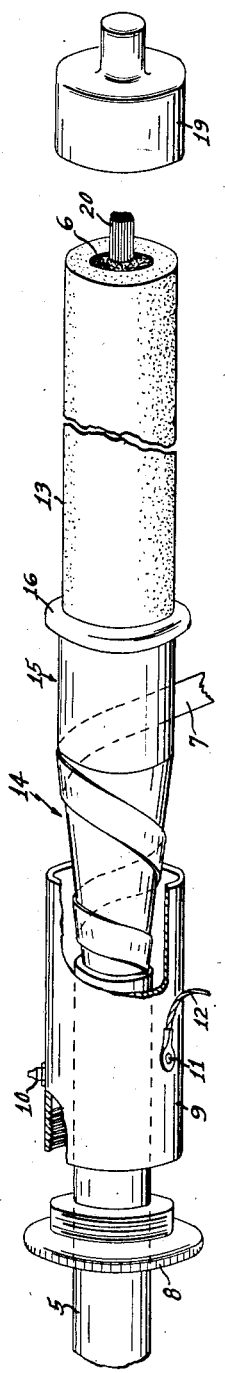
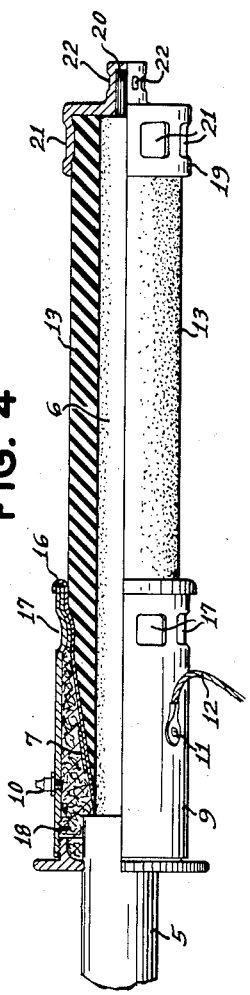
INVENTOR
Ludwig F. Roehmann
ATTORNEYS United States Patent Office

2,827,508
Patented Mar. 18, 1958

2,827,508

TERMINAL ASSEMBLY FOR SHIELDED CABLES

Ludwig F. Roehmann, Spokane, Wash., assignor to Anaconda Wire and Cable Company, New York, N. Y., a corporation of Delaware Application February 24, 1953, Serial No. 338,428

2 Claims. (Cl. 174—73)

This invention relates to a terminal assembly for electric cables that is particularly adapted for use with shielded electric cable in high voltage out-of-doors aerial installations.

Shielded aerial cable commonly comprises a main conductor, a layer of insulation surrounding the conductor, a metallic shield surrounding the insulation, and an outer protective jacket. The termination of such cables in high voltage out-of-doors service presents substantial problems. Unless special means are provided the electrical discontinuity at the shielding tape termination tends to cause one of two types of failure: puncture of the insulation, and "tracking" along its surface due to tangential components of electrical stress, particularly when the exposed surface is conducive to tracking. Therefore means must be provided at the terminations of high-voltage cables to prevent breakdown from puncture and tracking under all conditions of exposure. This is true in a general way but the following discussion is restricted to cables, particularly aerial cables, for voltages up to approximately 15 kilovolts. For this service and voltage range, the only terminals which have proved to be reliable are the so-called potheads. Such terminals are made by building up the cable insulation at the terminal with a heavy application of insulating tapes, enclosing the taped end portion of the cable in a porcelain insulator, and then filling the space inside the insulator that is not occupied by the taped end portion of the cable with a compound (usually bituminous) which has insulating properties and is effective for sealing the terminal against moisture. In such a pothead, the built-up insulation increases the dielectric strength, and the porcelain insulator provides the tracking-resistant surface. The installation of pothead terminals is costly, not only for the materials used, but also because it requires the services of highly skilled mechanics both to apply the tapes correctly and to install and seal the pothead porcelain.

The present invention provides an improved cable terminal assembly which requires no taping of the cable and no porcelain insulator. Assembly of this improved terminal in the field is simple and rapid and requires a minimum of special tools. Field assembly can be carried out even under awkward working conditions, such as prevail atop power line poles, by linemen who are unskilled in the specialty of taping high voltage terminals and splices. The new terminal assembly has high dielectric strength and high tracking resistance under all weather conditions. It provides permanent termination of the cable shielding and facilitates connection of the cable shield to ground. The assembly has been found to meet the electrical and mechanical requirements for reliable out-of-doors service even when fully exposed on poles to the weather. Furthermore, all parts necessary for the new terminal assembly can be manufactured for stock, irrespective of the bare and insulated conductor size in the cable employed.

In the new cable terminal assembly, a homogenous, smooth body, of high dielectric strength and high tracking resistance, is applied over the factory insulation, and integrated with the shielding tape termination at one end and with the live conductor at the other end in such a way that the required dielectric reinforcement (radially and tangentially) is accomplished. Specifically, a tube of insulating material, preferably of polyethylene, cylindrical in shape, with one end pencilled down (conically tapered) is placed over the exposed layer of factory insulation, with its forward end adjacent to the end of the cable and with its pencilled-down rearward end substantially abutting the end of the cable jacket an appreciable distance back from the end of the cable. A metallic sleeve surrounds at least the tapered portion of the tube of insulating material as well as an end portion of the cable jacket. This sleeve is closed at its rearward end by a metallic cover which fits snugly over the cable jacket and engages the rearward end of the sleeve, for example, by a threaded portion screwed into the sleeve. A metallic ferrule underlies at least the forward end of the sleeve and closely surrounds the tube of insulating material. The forward end of the shield is brought up around the tapered portion of the tube and is positioned between the forward end of the metallic sleeve and the underlying metallic ferrule. The forward end portion of the metallic sleeve then is circumferentially compressed tightly in place so as to clamp the forward end of the shield securely between the sleeve and the ferrule and make a good electrical connection between these elements. The free space inside the metallic sleeve is filled with a sealing compound, to exclude air and moisture from the assembly and to prevent ionization at the point of departure of the shielding tape from the underlying factory-applied insulation. A messenger wire for connecting the shield to ground may be clamped or otherwise secured to the metallic sleeve.

To complete the terminal assembly, a conductor terminal fitting surrounding a forward end portion of the tube of insulating material and the cable conductor is secured to the cable conductor at the end of the cable, and this terminal fitting is then compressed tightly in place against both the tube and the conductor. This fitting serves to secure the forward end at the insulating tube to the cable and to hold the terminal assembly in place.

The forward end of the metallic ferrule is flared outwardly and bent back to form a convexly curved flange. Thus, there will be no sharp conducting edge adjacent to the underlying insulating tube where lines of force might concentrate and subject the insulation to excessive electrical stress. Alternatively, the convexly curved flange may be formed at the forward end of the metallic sleeve instead of at the forward end of the metallic ferrule, and in such case the sleeve is applied so that its flange end projects beyond the forward edge of the ferrule and preferably is there compressed against the tube of insulating material. This alternative is the electrical equivalent of the structure just described, though as a practical matter it is less desirable.

A preferred embodiment of the invention is shown in the accompanying drawings, which also illustrate the method by which the new terminal fitting is applied to shielded cable.

In the drawings:

Fig. 1 shows a shielded cable prepared to receive the terminal assembly;

Fig. 2 is an exploded view showing the various components of the terminal assembly, some of them in section;

Fig. 3 is a view, with parts broken away, of the terminal in an intermediate stage of assembly; and Fig. 4 is a partial longitudinal section of the assembled cable terminal.

Referring first to Fig. 1, the shielded electric cable to which the new terminal is to be applied is prepared by removing the outer protective cable jacket 5 for an appreciable distance back from the end of the cable, in order to bare the factory-applied layer of insulation 6 and the metal shield tape 7 which has been helically applied about the factory insulation 6. The distance for which the protective jacket is removed depends primarily on the voltage rating of the cable. For a 7.5 kv. cable, it may be one foot; more for higher, less for lower voltages. The helically wound metal shield tape 7 is unwound from around the insulation 6 back to the point to which the outer protective jacket 5 has been removed.

After the cable has been prepared in the above manner, the various components of the terminal, shown in Fig. 2, are assembled about the prepared end of the cable as shown in Fig. 3. A metallic cover or collar 8, having a male threaded portion and having a bore therethrough of a diameter substantially the same as or very slightly smaller than the external diameter of the jacketed cable, is pushed back over the cable jacket 5. Advantageously, the bore is flared to facilitate pushing the cover over the jacket. A metallic sleeve 9, having a female threaded portion at its rearward end to engage the male threaded portion of the cover 8, is then slipped over the cable jacket. The sleeve is provided with a pressure fitting 10 for the admission of a sealing compound (a fitting of the type known as an "Alemite" fitting is excellently suited for this purpose) extending through its wall. It also is provided with a vent hole, which is sealed by a screw plug 11, extending through its wall. A messenger wire 12 may be electrically connected to the plug 11 in order to ground the sleeve 9.

Next a tube 13, preferably of polyethylene composition, having an inside diameter, the same as or only very slightly larger than the external diameter of the layer of factory insulation 6, is slid over the exposed length of factory insulation so that its rearward end abuts against the end of the protective jacket 5. The rearward end portion 14 of the polyethylene tube 13 is tapered and slopes down to meet the layer of factory-applied insulation which it surrounds. The forward end of the polyethylene tube 13 preferably coincides with the end of the layer of factory insulation 6.

The rearward end portion of the tube 13 carries a metallic ferrule 15. The ferrule most advantageously fits tightly about and completely covers the tapered end portion 14 of the tube 13, and it includes a cylindrical portion 15a which closely surrounds the tube 13 just forward (to the right, as viewed in the drawings) of the tapered end portion 14. The forward end of the ferrule is flared outwardly and backwardly to form a convexly curved flange 16. The ferrule 15, especially if it includes the tapered end surrounding the tapered portion 14 of the sleeve, is preferably pre-assembled with the sleeve at the factory. The ferrule 15 may, however, consist solely of a short cylindrical section 15a, together with the flange 16, which surrounds only the cylindrical portion of the tube 13 adjacent the tapered portion 14 thereof; and in such event it may be pre-assembled with the tube 13 at the factory, or it may be applied thereto in the field.

The metal shield tape 7, which has been unwound from the layer of factory insulation 6 back to the point to which the protective jacket 5 has been removed, is rewound over and slightly beyond the tapered portion 14 of the polyethylene tube 13. In order to keep the shield tape flat against the tapered surface 14 of the polyethylene tube, the pitch of the helical winding of the metallic shield tape thereover must increase as the winding progresses from the small end to the large end of the tapered portion.

This results in leaving portion of the tapered surface uncovered by the shield, and is most undesirable, if the metallic ferrule does not itself completely cover the tapered end portion 14 of the sleeve. In such event the tapered portion 14 is completely metal-covered in some fashion as by applying a layer of tin or lead foil, before bringing the shield tape up over it. If, however, the ferrule 15 completely covers the tapered end portion of the sleeve, no such precaution is necessary. The metal shield tape 7 is brought to beyond the tapered portion 14 and wrapped about the cylindrical portion 15a of the ferrule, and then the excess tape is cut off.

The sleeve 9 is moved forward over the tapered portion 14 of the polyethylene tube 13, over the metallic ferrule 15, and over the shield tape 7, until it abuts the flange 16. The forward end portion of the sleeve 9 is then crimped with an appropriate crimping tool to compress the sleeve circumferentially against the end of the metal shield tape and against the metallic ferrule 15, which in turn is compressed tightly against the polyethylene tube 13. This is accomplished by the crimps 17 (shown in Fig. 4) which lock the terminal components together and hold them in place. The crimping also insures a good electrical connection between the shield tape 7, the ferrule 15 and the sleeve 9, all of which are grounded by the messenger wire 12.

The metallic cover 8 is now moved forward over the outer protective cable jacket 5 and its threaded male portion is screwed into the female threaded rearward end portion of the sleeve 9 in closing engagement therewith. Then the free space inside the sleeve 9 is filled through the pressure fitting 10 with a silicone grease or other sealing compound 18 (as shown in Fig. 4). Prior to filling this space with the sealing compound 18, the vent hole plug 11 is removed from the vent hole in the sleeve 9 so that the sealing compound will displace all of the air from within the sleeve 9. When the space inside the sleeve 9 is completely filled with compound the vent hole plug 11 is replaced. This filling of sealing compound prevents any ingress of moisture and, by replacing the air, prevents air ionization due to electrical stresses that develop in the vicinity of the shield termination.

The cable assembly is completed by placing a metallic terminal fitting 19 around the forward end portion of the polyethylene tube 13 and around the exposed cable conductor 20, as shown in Figs. 3 and 4. This fitting is slipped over the exposed cable conductor 20 so that its larger portion, having an internal diameter substantially the same as or only slightly larger than the external diameter of the polyethylene tube 13, surrounds the end of the polyethylene tube 13, and so that its internal shoulder abuts against the ends of the polyethylene tube 13 and the layer of factory insulation 6. The smaller portion of the terminal fitting 19 closely surrounds the exposed cable conductor 20. As shown in Fig. 4, the wall of the large portion of the terminal fitting 19 is crimped to the polyethylene tube (by crimps 21), and the wall of the small portion of the terminal 20 is crimped to the cable conductor (by crimps 22). Thus, the terminal fitting 19 provides an electrical connection with the cable conductor 20, and also serves to hold the entire terminal assembly in place since it is crimped against the conductor 20 and against the insulating tube 13. The outside diameters of the terminal fitting 19 and of the sleeve 9 are preferably the same, so that crimps 17 in the sleeve and crimps 21 in the terminal fitting are made with the same crimping die. Of course, it will be understood that the invention is not limited to any particular form of terminal fitting 19.

It can be seen from the preceding description that in the new terminal assembly the factory applied insulation 6 between the terminal fitting 19 and the ferrule flange 16 is fully protected by the insulating tube 13. Polyethylene has been found to be an exceptionally good material for the tube 13 since it has high tracking resistance even when wet with water or salt spray. Furthermore, its good electrical properties, in this and other respects, and its good mechanical properties, are not adversely affected by prolonged exposure to freezing conditions, or to the hot sun, or to dry or humid atmospheres, or to other weather conditions. Furthermore, the smooth surface of a tube (as distinct from a taped surface) prevents dust, dirt, and salt accumulation in recesses. Under the effect of rain, such a surface tends naturally to remain clean.

It is noteworthy that all of the components of the new terminal assembly can be manufactured for stock. When the components are made for stock, the holes through the cover 8, through the polyethylene tube 13 (and ferrule 15 when such is factory-applied to cover the tapered surface of the tube 13), and through the terminal fitting 19 are not drilled until the size of the cable to which the termination assembly is to be applied is selected. Further, field assembly is simple and rapid. Only two crimping dies, the same for all sizes of cable, are required as special tools.

I claim:

1. In combination with a cable comprising a conductor surrounded by a layer of insulation and having an electrically conducting shield surrounding the layer of insulation and a protective jacket surrounding the shield, said jacket terminating an appreciable distance back from the end of the cable, a cable terminal assembly comprising a tube of insulating material surrounding said layer of insulation with its forward end adjacent to the end of the cable and its rearward end underlying the shield adjacent the point where the cable jacket terminates, the rearward end portion of said tube being tapered and sloping down to said layer of insulation, a metallic sleeve spaced from and surrounding at least the tapered portion of said tube of insulating material and with its rearward end overlying the cable jacket adjacent the termination thereof, a metallic cover in closing engagement with the rearward end of said sleeve and closely surrounding the cable jacket, a metallic ferrule closely and completely covering the tapered portion of said tube of insulating material and underlying the forward end portion of said sleeve, the forward end portion of said sleeve being compressed tightly in place so as to clamp the forward end of the shield between the sleeve and the ferrule in good electrical contact therewith, a filling of sealing compound in the space between the shield surrounding said tapered portion of said tube of insulating material and said metallic sleeve, and a terminal fitting surrounding the forward end portion of the tube of insulating material and the cable conductor, said terminal fitting being compressed tightly in place against said tube and said conductor.

2. The combination with a cable comprising a conductor surrounded by a layer of insulation and having an electrically conducting shield surrounding the layer of insulation and a protective jacket surrounding the shield, said jacket terminating an appreciable distance back from the end of the cable, of a terminal assembly for the shield comprising a tube of insulating material surrounding said layer of insulation with its forward end adjacent to the end of the cable and its rearward end underlying the shield at a point an appreciable distance back from the end of the cable, the rearward end portion of said tube being tapered and sloping down to said layer of insulation, a metallic sleeve spaced from and surrounding at least the tapered portion of said tube of insulating material with its rearward end overlying the end portion of the cable jacket, a metallic cover in closing engagement with the rearward end of said sleeve and closely surrounding the cable jacket, and a metallic ferrule surrounding said tube of insulating material and underlying the forward end of said shield and the forward end portion of said sleeve, the forward end portion of said sleeve being compressed tightly in place so as to clamp the shield securely between the sleeve and the ferrule in good electrical contact therewith, and sealing compound filling the interior of said sleeve.

References Cited in the file of this patent

UNITED STATES PATENTS

| | | |
|---|---|---|
| 2,174,377 | Bowden et al. | Sept. 26, 1939 |
| 2,297,471 | Gutzmann et al. | Sept. 29, 1942 |
| 2,396,283 | Papst | Mar. 12, 1946 |
| 2,428,608 | Bass | Oct. 7, 1947 |
| 2,451,868 | Quackenbush et al. | Oct. 19, 1948 |
| 2,536,003 | Dupre | Dec. 26, 1950 |
| 2,696,518 | Roehmann et al. | Dec. 7, 1954 |

OTHER REFERENCES

Serial No. 178,414, Lepetit (A. P. C.), published June 22, 1943.